United States Patent
Folting et al.

(10) Patent No.: US 7,831,539 B2
(45) Date of Patent: Nov. 9, 2010

(54) DYNAMICALLY FILTERING AGGREGATE REPORTS BASED ON VALUES RESULTING FROM ONE OR MORE PREVIOUSLY APPLIED FILTERS

(75) Inventors: Allan Folting, Redmond, WA (US); Weide Zhong, Sammamish, WA (US); Robert Hawking, Seattle, WA (US); Tigran Hayrapetyan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1290 days.

(21) Appl. No.: 11/157,634

(22) Filed: Jun. 21, 2005

(65) Prior Publication Data

US 2006/0287998 A1 Dec. 21, 2006

(51) Int. Cl.
G06F 17/00 (2006.01)
(52) U.S. Cl. .................................. 707/600; 715/218
(58) Field of Classification Search ................. 715/218
See application file for complete search history.

(56) References Cited

U.S. PATENT DOCUMENTS

| | | | | |
|---|---|---|---|---|
| 5,701,400 A * | 12/1997 | Amado | ................. | 706/45 |
| 5,710,900 A * | 1/1998 | Anand et al. | ................. | 715/764 |
| 6,195,653 B1 * | 2/2001 | Bleizeffer et al. | ............. | 707/2 |
| 6,341,286 B1 * | 1/2002 | Kawano | ................. | 707/101 |
| 6,393,422 B1 * | 5/2002 | Wone | ................. | 707/10 |
| 6,405,207 B1 * | 6/2002 | Petculescu et al. | ............. | 707/102 |
| 6,539,370 B1 * | 3/2003 | Chang et al. | ................. | 707/2 |
| 6,539,371 B1 * | 3/2003 | Bleizeffer et al. | ............. | 707/2 |
| 6,738,770 B2 * | 5/2004 | Gorman | ................. | 707/7 |
| 7,082,568 B2 * | 7/2006 | Iwamoto et al. | ............. | 715/212 |
| 7,246,128 B2 * | 7/2007 | Jordahl | ................. | 707/100 |
| 7,275,207 B2 * | 9/2007 | Aureglia et al. | ............. | 715/214 |
| 7,289,976 B2 * | 10/2007 | Kihneman et al. | ............. | 707/752 |
| 7,293,031 B1 * | 11/2007 | Dusker et al. | ............. | 707/101 |
| 7,464,087 B2 * | 12/2008 | Shlaes et al. | ................. | 707/5 |
| 7,546,823 B2 * | 6/2009 | Buelna | ................. | 123/90.16 |
| 2002/0143809 A1 * | 10/2002 | Bennett | ................. | 707/503 |
| 2003/0188256 A1 * | 10/2003 | Aureglia et al. | ............. | 715/503 |
| 2005/0010565 A1 * | 1/2005 | Cushing et al. | ................. | 707/3 |
| 2005/0034064 A1 * | 2/2005 | Meyers et al. | ............. | 715/513 |
| 2006/0080594 A1 * | 4/2006 | Chavoustie et al. | ......... | 715/503 |

* cited by examiner

*Primary Examiner*—Neveen Abel Jalil
*Assistant Examiner*—Christyann R Pulliam
(74) *Attorney, Agent, or Firm*—Merchant & Gould P.C.

(57) ABSTRACT

Methods, systems, and computer program products dynamically filter an aggregate report based on values resulting from one or more filters previously applied to the aggregate report. A method involves maintaining a collection of filters to be applied in a designated evaluation order to the aggregate report, applying a first filter to the aggregate report, and evaluating values in the aggregate report to produce aggregate values resulting from applying the first filter. The method also involves applying a next filter to the aggregate report and evaluating the aggregate values in the aggregate report resulting from applying the first filter therein producing aggregate values resulting from applying the next filter to the aggregate report. Additionally, the method involves displaying the aggregate report wherein evaluating values resulting from previously applying any filter to the aggregate report involves evaluating visual values displayed in the aggregate report after each previous filter has been applied.

17 Claims, 11 Drawing Sheets

| Sum of Count | Name | Allan | | |
|---|---|---|---|---|
| Year | | Bo | Per | Grand Total |
| 2000 | 6 | 7 | 7 | 20 |
| 2001 | 1 | 6 | 7 | 14 |
| 2002 | 14 | 9 | 10 | 33 |
| Grand Total | 21 | 22 | 24 | 67 |

404

| Sum of Count | Name | Bo | | |
|---|---|---|---|---|
| Year | | Bo | Per | Grand Total |
| 2000 | | 7 | 7 | 14 |
| 2001 | | 6 | 7 | 13 |
| 2002 | | 9 | 10 | 19 |
| Grand Total | | 22 | 24 | 46 |

407

| Sum of Count | Name | Bo | |
|---|---|---|---|
| Year | | Per | Grand Total |
| 2000 | | 7 | 7 |
| 2002 | | 9 | 10 |
| Grand Total | | 16 | 17 |

410

| Sum of Count | Name | Allan | | |
|---|---|---|---|---|
| Year | | Bo | Per | Grand Total |
| 2000 | 6 | 7 | 7 | 20 |
| 2002 | 14 | 9 | 10 | 33 |
| Grand Total | 20 | 16 | 17 | 53 |

412

| Sum of Count | Name | Allan | | |
|---|---|---|---|---|
| Year | | Bo | Per | Grand Total |
| 2000 | 6 | 7 | 7 | 13 |
| 2002 | 14 | 9 | 10 | 24 |
| Grand Total | 20 | 16 | 17 | 37 |

| TIME | 1998 | | | | | | |
|---|---|---|---|---|---|---|---|
| | | | STORE TYPE | | | | |
| PRODUCT FAMILY | COUNTRY | DATA | DELUXE SUPERMARKET | GOURMET SUPERMARKET | MID-SIZE GROCERY | SMALL GROCERY | SUPERMARKET | GRAND TOTAL |
| DRINK | CANADA | STORE SALES | $6,767.86 | | $1,901.98 | | | $8,669.84 |
| | | PROFIT | $4,069.18 | | $1,129.79 | | | $5,198.97 |
| | MEXICO | STORE SALES | $19,464.96 | $4,129.77 | $3,676.56 | $367.03 | $9,251.99 | $36,890.31 |
| | | PROFIT | $11,684.87 | $2,479.57 | $2,222.50 | $217.64 | $5,561.64 | $22,166.22 |
| | USA | STORE SALES | $12,761.12 | $4,325.65 | $1,739.03 | $1,116.85 | $28,239.36 | $48,182.01 |
| | | PROFIT | $7,646.65 | $2,579.38 | $1,042.39 | $679.62 | $16,930.27 | $28,878.31 |
| DRINK STORE SALES | | | $38,993.94 | $8,455.42 | $7,317.57 | $1,483.88 | $37,491.35 | $93,742.16 |
| DRINK PROFIT | | | $23,400.70 | $5,053.96 | $4,394.67 | $897.25 | $22,491.91 | $56,243.49 |
| FOOD | CANADA | STORE SALES | $55,693.47 | | $14,335.51 | | | $70,028.98 |
| | | PROFIT | $33,365.11 | | $8,589.86 | | | $41,954.97 |
| | MEXICO | STORE SALES | $166,744.06 | $36,404.88 | $32,030.87 | $3,077.67 | $72,783.95 | $311,041.43 |
| | | PROFIT | $99,793.44 | $21,791.84 | $19,189.01 | $1,856.71 | $43,539.13 | $186,170.13 |
| | USA | STORE SALES | $108,995.89 | $34,458.81 | $15,123.65 | $9,857.03 | $228,630.01 | $397,065.39 |
| | | PROFIT | $65,340.46 | $20,669.60 | $9,065.81 | $5,948.09 | $136,993.11 | $238,017.06 |
| FOOD STORE SALES | | | $331,433.42 | $70,863.69 | $61,490.03 | $12,934.70 | $301,413.96 | $778,135.80 |
| FOOD PROFIT | | | $198,499.01 | $42,461.43 | $36,844.67 | $7,804.79 | $180,532.24 | $466,142.16 |
| NON-CONSUMABLE | CANADA | STORE SALES | $15,469.84 | | $3,876.80 | | | $19,346.64 |
| | | PROFIT | $9,232.50 | | $2,326.45 | | | $11,558.95 |
| | MEXICO | STORE SALES | $44,283.39 | $9,512.86 | $8,485.27 | $884.17 | $19,196.16 | $82,361.85 |
| | | PROFIT | $26,551.29 | $5,670.43 | $5,103.08 | $531.29 | $11,513.10 | $49,369.20 |
| | USA | STORE SALES | $28,427.36 | $9,059.46 | $3,902.27 | $2,268.90 | $61,903.03 | $105,561.02 |
| | | PROFIT | $17,058.65 | $5,427.94 | $2,338.50 | $1,361.54 | $37,081.31 | $63,267.94 |
| NON-CONSUMABLE STORE SALES | | | $88,180.59 | $18,572.32 | $16,264.34 | $3,153.07 | $81,099.19 | $207,269.51 |
| NON-CONSUMABLE PROFIT | | | $52,842.44 | $11,093.37 | $9,768.03 | $1,892.84 | $48,594.42 | $124,196.09 |
| TOTAL STORE SALES | | | $458,607.95 | $97,891.43 | $85,071.94 | $17,571.65 | $420,004.50 | $1,079,147.47 |
| TOTAL PROFIT | | | $274,742.15 | $58,613.76 | $51,007.38 | $10,594.88 | $251,618.57 | $646,531.74 |

*Fig. 5*

| Time | 1998 | | | | |
|---|---|---|---|---|---|
| | | | Store Type | | |
| Product Family | Country | Data | Deluxe Supermarket | Supermarket | Grand Total |
| Food | Mexico | Store Sales | $166,744.06 | $72,783.95 | $239,528.01 |
| | | Profit | $99,793.44 | $43,539.13 | $143,332.57 |
| | USA | Store Sales | $108,995.89 | $228,630.01 | $337,625.90 |
| | | Profit | $65,340.46 | $136,993.11 | $202,333.57 |
| Food Store Sales | | | $275,739.95 | $301,413.96 | $577,153.91 |
| Food Profit | | | $165,133.90 | $180,532.24 | $345,666.14 |
| Non-Consumable | Mexico | Store Sales | $44,283.39 | $19,196.16 | $63,479.55 |
| | | Profit | $26,551.29 | $11,513.10 | $38,064.39 |
| | USA | Store Sales | $28,427.36 | $61,903.03 | $90,330.39 |
| | | Profit | $17,058.65 | $37,081.31 | $54,139.96 |
| Non-Consumable Store Sales | | | $72,710.75 | $81,099.19 | $153,809.94 |
| Non-Consumable Profit | | | $43,609.93 | $48,594.42 | $92,204.35 |
| Total Store Sales | | | $348,450.70 | $382,513.15 | $730,963.85 |
| Total Profit | | | $208,743.84 | $229,126.66 | $437,870.49 |

DYNAMICALLY FILTERING AGGREGATE REPORTS BASED ON VALUES RESULTING FROM ONE OR MORE PREVIOUSLY APPLIED FILTERS

BACKGROUND

Conventional processes that filter aggregate reports based on values lack the ability to filter based on the visible values or totals in the aggregated report. Thus, applying a filter to an aggregate report that has already been filtered only accounts for global values and therefore does not account for the filtering that has already been applied. Practically, this may cause users who visually inspect a filtered aggregate report and manually spot the desired values to see a different result once a corresponding filter is applied. After applying the corresponding filter, the user may discover that the values spotted as the desired values are not included in the filtered result. Consequently, users frequently complain about filtering based on the invisible global values in aggregate reports.

SUMMARY

Embodiments of the present invention filter an aggregate report based on values resulting from one or more filters previously applied to the aggregate report. In general, the embodiments of the present invention apply filters to an aggregate report step by step. At each step embodiments of the present invention evaluate or recalculate aggregate values, for example totals, in the aggregate report to use as inputs for the next step. Filters are made to apply to the current aggregate report values or totals such that, for example, applying a filter to an aggregate report will always be evaluated against values currently displayed in the aggregate report. Thus, an aggregate report is evaluated based on values of the items currently in the filters applied to the fields in the aggregate report. The order of applying the filters may be the order by which the filters are originally created. This order may also be operative when reapplying filters on a refresh instruction. Embodiments of the present invention make filtering in aggregate reports more powerful as well as predictable for users.

One embodiment is a method for dynamically filtering an aggregate report based on values resulting from one or more filters previously applied to the aggregate report. The method involves maintaining a collection of filters to be applied in a designated evaluation order to the aggregate report, applying a first filter to the aggregate report, and based on the first filter evaluating aggregate values in the aggregate report to produce aggregate values resulting from applying the first filter. The method also involves applying a next filter to the aggregate report and based on the next filter, evaluating the values in the aggregate report resulting from applying the first filter therein producing aggregate values in the aggregate report resulting from applying the next filter.

Another embodiment is a computer program product including a computer-readable medium having control logic stored therein for causing a computer to dynamically filter an aggregate report based on values resulting from one or more filters previously applied to the aggregate report. The control logic includes computer-readable program code for causing the computer to maintain a collection of filters to be applied in a designated evaluation order to the aggregate report, apply a first filter to the aggregate report, and evaluate values in the aggregate report based on the first filter therein producing aggregate values in the aggregate report resulting from applying the first filter. The control logic also includes computer-readable program code for causing the computer to apply a next filter to the aggregate report and based on the next filter, evaluate the aggregate values in the aggregate report resulting from any filters previously applied therein producing values in the aggregate report resulting from applying the next filter.

Still another embodiment is a computer-implemented method for dynamically filtering aggregate reports based on visible values in the aggregate reports. The method involves maintaining a plurality of filters to be applied in a designated order to aggregate reports, applying a first filter to an original aggregate report, and evaluating values of the original aggregate report based on the first filter therein producing an intermediate filtered aggregate report. The method further involves applying a next filter to the intermediate filtered aggregate report and evaluating visible values of the intermediate filtered aggregate report based on the next filter therein producing a next filtered aggregate report.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As briefly described above, embodiments of the present invention are directed to methods, computer program products, and systems for dynamically filtering an aggregate report based on values resulting from one or more filters previously applied to the aggregate report. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
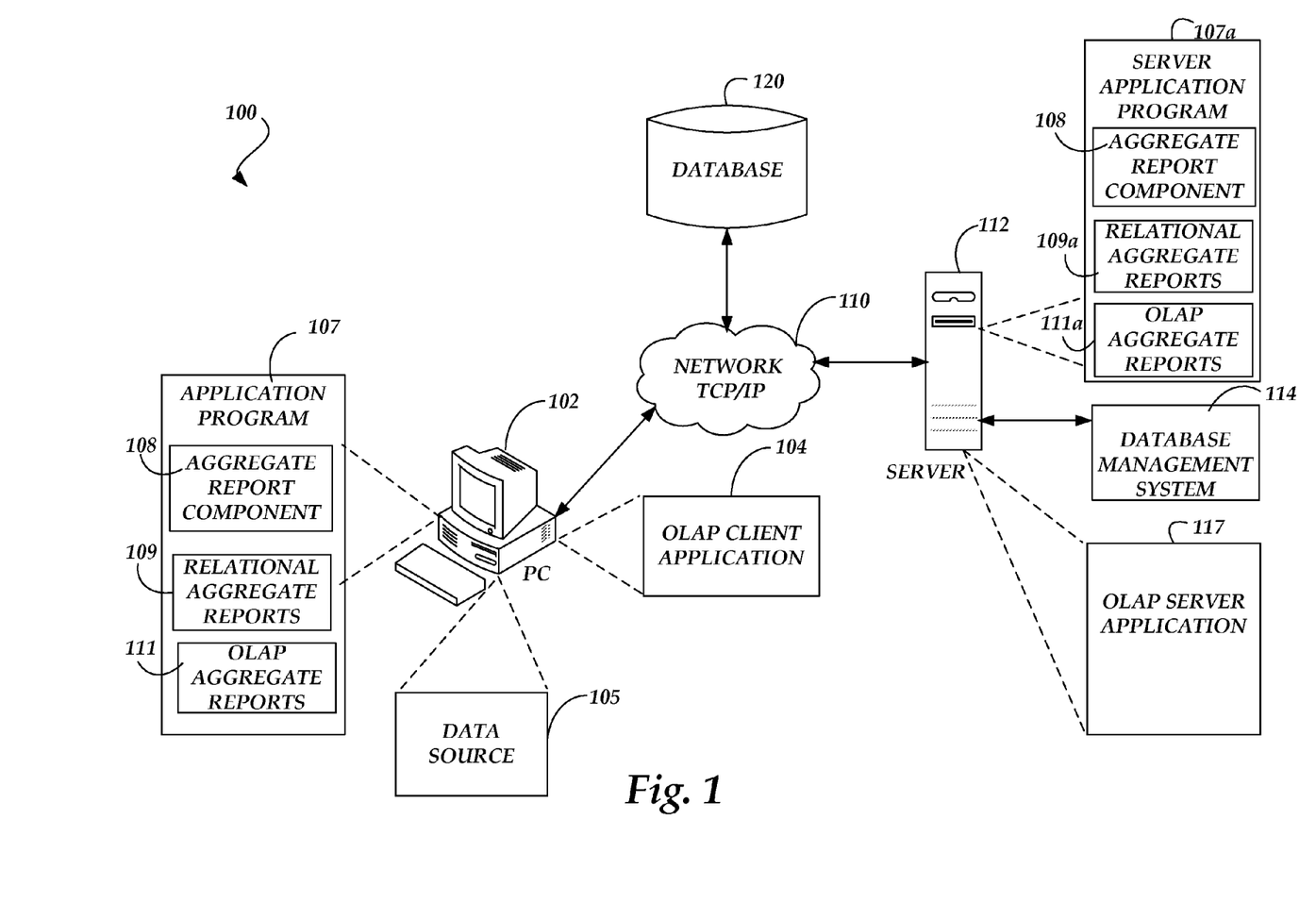
FIG. 1 is a block diagram illustrating client a computing apparatus, a server, a database, and a network architecture that provide an illustrative operating environment for illustrative embodiments of the present invention.
Figure 2:
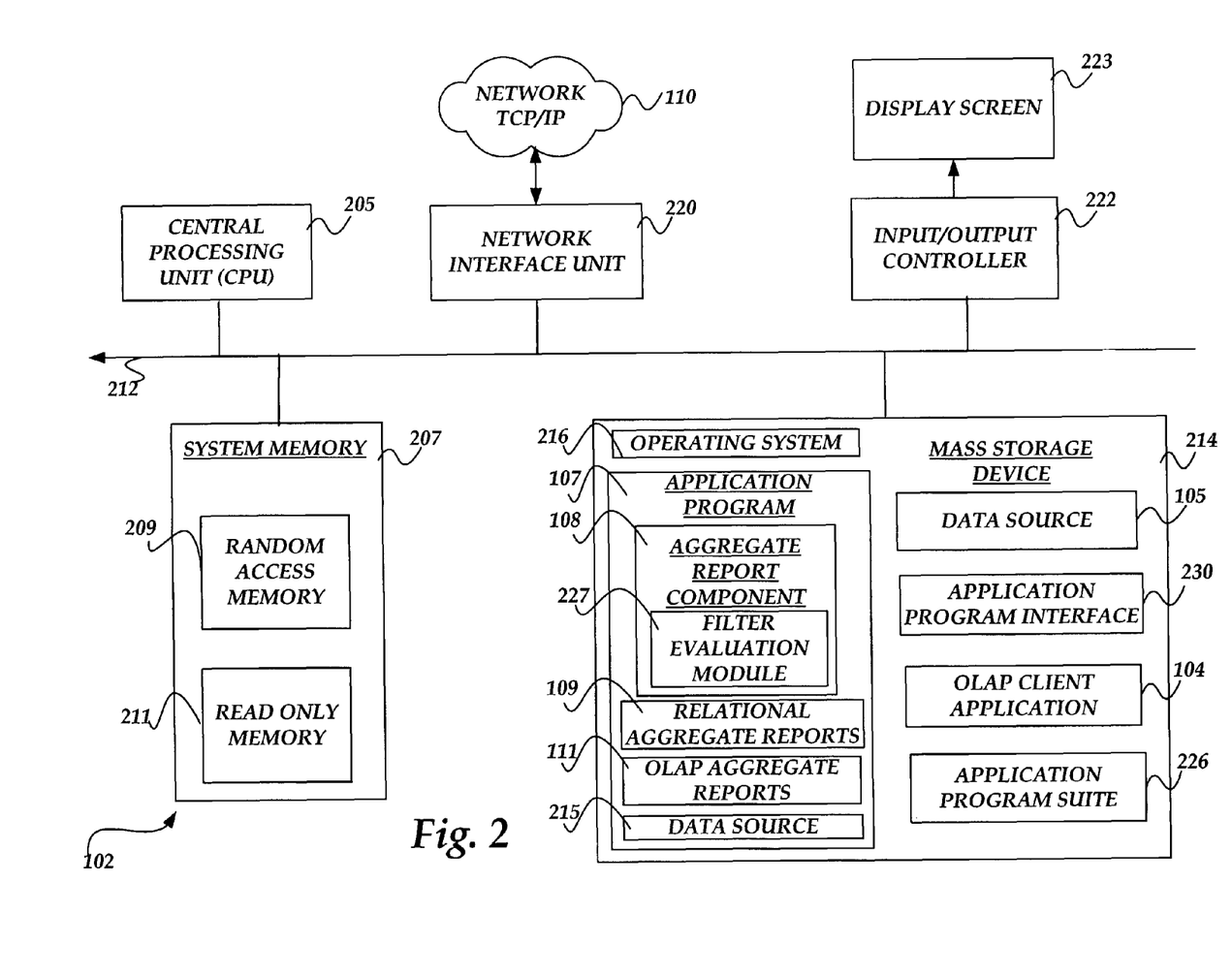
FIG. 2 is a computing system architecture illustrating a computing apparatus utilized in and provided by various illustrative embodiments of the invention.

Referring now to the drawings, in which like numerals refer to like elements through the several figures, aspects of the present invention and an exemplary operating environment will be described. FIGS. 1-2 and the following discussion are intended to provide a brief, general description of a suitable computing environment in which the invention may be implemented. While the invention will be described in the general context of program modules that execute in conjunction with an application program that runs on an operating system on a personal or server computer, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 is a block diagram illustrating a client computing apparatus 102, a server 112, a database 120 and a network architecture that provide an illustrative operating environment 100 for illustrative embodiments of the present invention. An application program 107 resides on the client computing apparatus 102 and includes an aggregate report component (ARC) 108, for example a cross-tab component. A similar application program 107*a* may reside on the server 112. According to an embodiment of the present invention, the application program 107 is operative to utilize the ARC 108 in providing and implementing aggregate reports, such as PivotTable reports, or other applications that provide and/or implement aggregate reports. For instance, the application program 107 may be the ACCESS database application or the EXCEL spreadsheet application, both from Microsoft, Corporation of Redmond, Wash. The ARC 108 is operative to read data from a data source 105, a database 120 via a network 110, or from within the application program 107 and aggregates the data in one or more aggregate reports based on the values of the data and filter specifications.

Similarly, an online analytical processing (OLAP) server application 117 may reside on the server 112. OLAP is a category of software tools that provides analysis of data stored in a database. OLAP tools enable users to analyze different dimensions of multidimensional data. The chief component of OLAP is the OLAP server 112, which sits between a client and a database management system 114 (DBMS). The OLAP server 112 understands how data is organized in the database and has special functions for analyzing the data. The OLAP server application 117 is capable of receiving instructions from an OLAP client application 104 via the network 110 and capable of returning aggregated results. One or more relational aggregate reports 109 and/or 109*a* and OLAP aggregate reports 111 and/or 111*a* may read aggregated data from the OLAP server and/or data from a data source 105. Additional details regarding the client computing apparatus 102 and operation of the ARC 108 will be described below with regard to FIGS. 2-10.

Turning now to FIG. 2, an illustrative architecture for a personal or server computer 102 for practicing the various embodiments of the invention will be described. The computer architecture shown in FIG. 2 illustrates a conventional personal or server computer, including a central processing unit 205 ("CPU"), a system memory 207, including a random access memory 209 ("RAM") and a read-only memory ("ROM") 211, and a system bus 212 that couples the memory to the CPU 205. A basic input/output system containing the basic routines that help to transfer information between elements within the computer, such as during startup, is stored in the ROM 211. The personal computer 102 further includes a mass storage device 214 for storing an operating system 216, application programs, such as the application program 107, and data, such as the data sources 105 and 215.

The mass storage device 214 is connected to the CPU 205 through a mass storage controller (not shown) connected to the bus 212. The mass storage device 214 and its associated computer-readable media, provide non-volatile storage for the personal computer 102. Although the description of computer-readable media contained herein refers to a mass storage device, such as a hard disk or CD-ROM drive, it should be appreciated by those skilled in the art that computer-readable media can be any available media that can be accessed by the personal computer 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 102 may operate in a networked environment using logical connections to remote computers through a TCP/IP network 110, such as the Internet. The personal computer 102 may connect to the TCP/IP network 110 through a network interface unit 220 connected to the bus 212. It should be appreciated that the network interface unit 220 may also be utilized to connect to other types of networks and remote computer systems. The personal computer 102 may also include an input/output controller 222 for receiving and processing input from a number of devices, including a keyboard or mouse (not shown). Similarly, an input/output controller 222 may provide output to a display screen or unit 223, a printer, or other type of output device.

As mentioned briefly above, a number of program modules and data files may be stored in the mass storage device 214 and RAM 209 of the personal computer 102, including an operating system 216 suitable for controlling the operation of a networked personal computer, such as the WINDOWS operating systems from Microsoft Corporation of Redmond, Wash. The mass storage device 214 and RAM 209 may also store one or more application programs. In particular, the mass storage device 214 and RAM 209 may store the application program suite 226 for providing a variety of functionalities to a user. For instance, the application program suite 226 may comprise many types of programs such as a word processing application, a spreadsheet application, a desktop publishing application, a database application, and the like. According to an embodiment of the present invention as described above, the application program suite 226 comprises a multiple functionality software application suite, such as the OFFICE software application suite from Microsoft, Corporation, for providing functionality from a number of different software applications.

Other application programs and data that may be stored by the mass storage device 214 include the application program 107, the OLAP client application 104, and the data sources 105 and 215. The ARC 108 includes a filter evaluation module 227 for tracking filters to be applied to aggregate reports and a designated order in which the filters are to be applied. The order of applying the filters may be changed by receiving a change in order policy for the plurality of filters. In response to receiving the change in order policy, the evaluation order placement for the plurality of filters is reordered. It should also be appreciated that the plurality of filters having a designated order of evaluation may be exposed by an application program interface 230. The data source 105 may include external relational data or OLAP data. In contrast, the data source 215 is a data source internal to the application program 107 and may include relational sheet data, for example from a spreadsheet. Additional details regarding dynamically filtering aggregate reports based on visible and/or aggregate values in the aggregate reports will be described below with respect to FIGS. 3-10.

Figure 3:
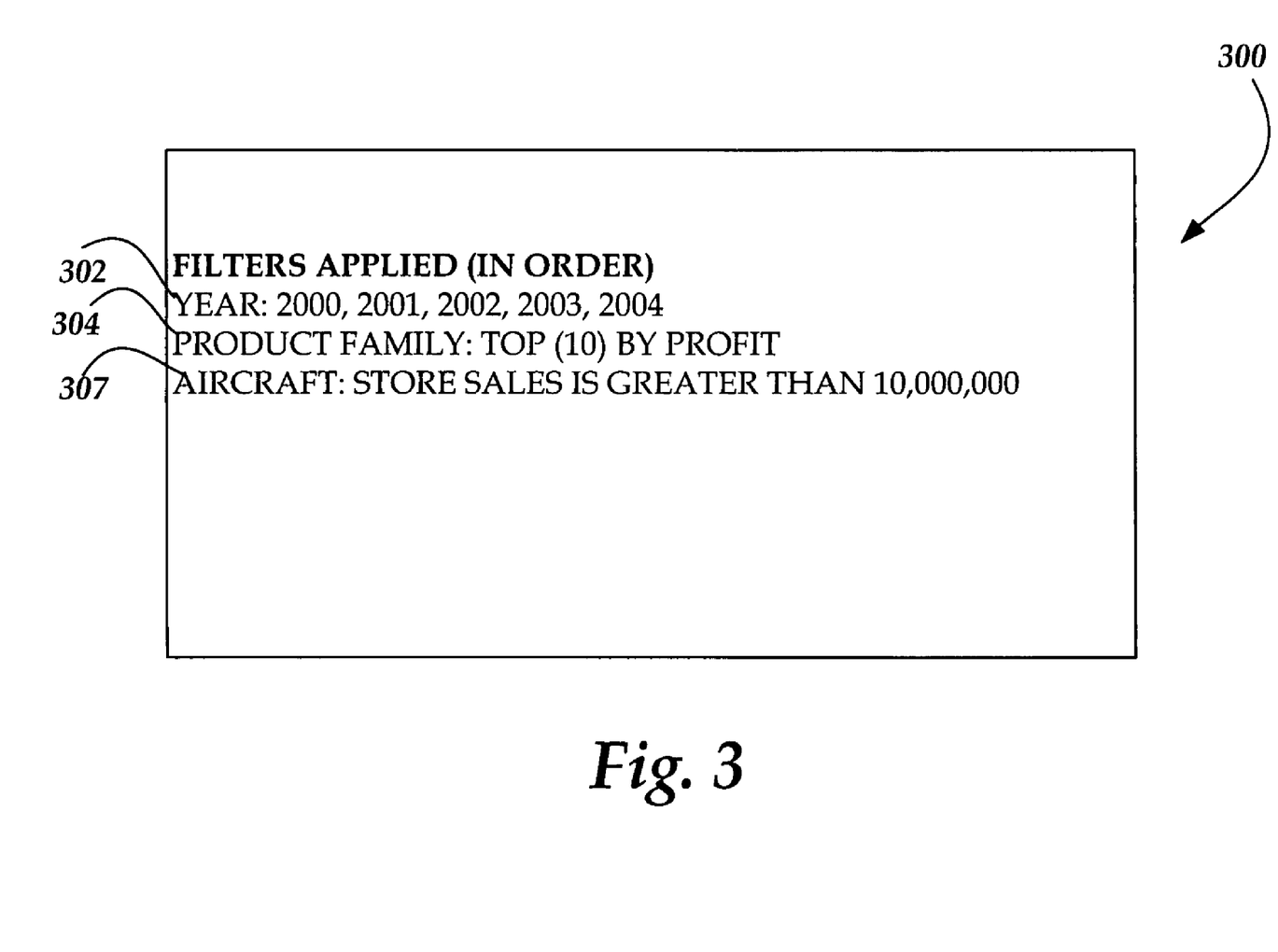
FIG. 3 is a computer screen display illustrating a user interface insert displaying a filter application 'read-out' according to an illustrative embodiment of the present invention.

FIG. 3 is a computer screen display illustrating a user interface (UI) insert displaying a filter 'read-out' 300 according to an illustrative embodiment of the present invention. The filter read-out 300 is basically a tool-tip that lists the filtered fields in order of evaluation with the type of filter applied. The UI insert 300 may be displayed over or next to an aggregate report implementing a collection or plurality of filters in a designated order. For instance, the UI insert 300 describes the filters applied in order of evaluation. A year filter indicator 302 acknowledges that year value filters are applied first to aggregate data for the years 2000-2004. Next a product family filter indicator 304 acknowledges that a top N value filter is applied for aggregating the highest ten product families by profit for the years specified in the first filter. Still further, an Aircraft filter indicator 307 acknowledges that a greater than filter is applied for aggregating each aircraft with store sales greater than ten (10) million dollars for the years specified in the first filter and for the top ten product families by profit.

Figure 4:
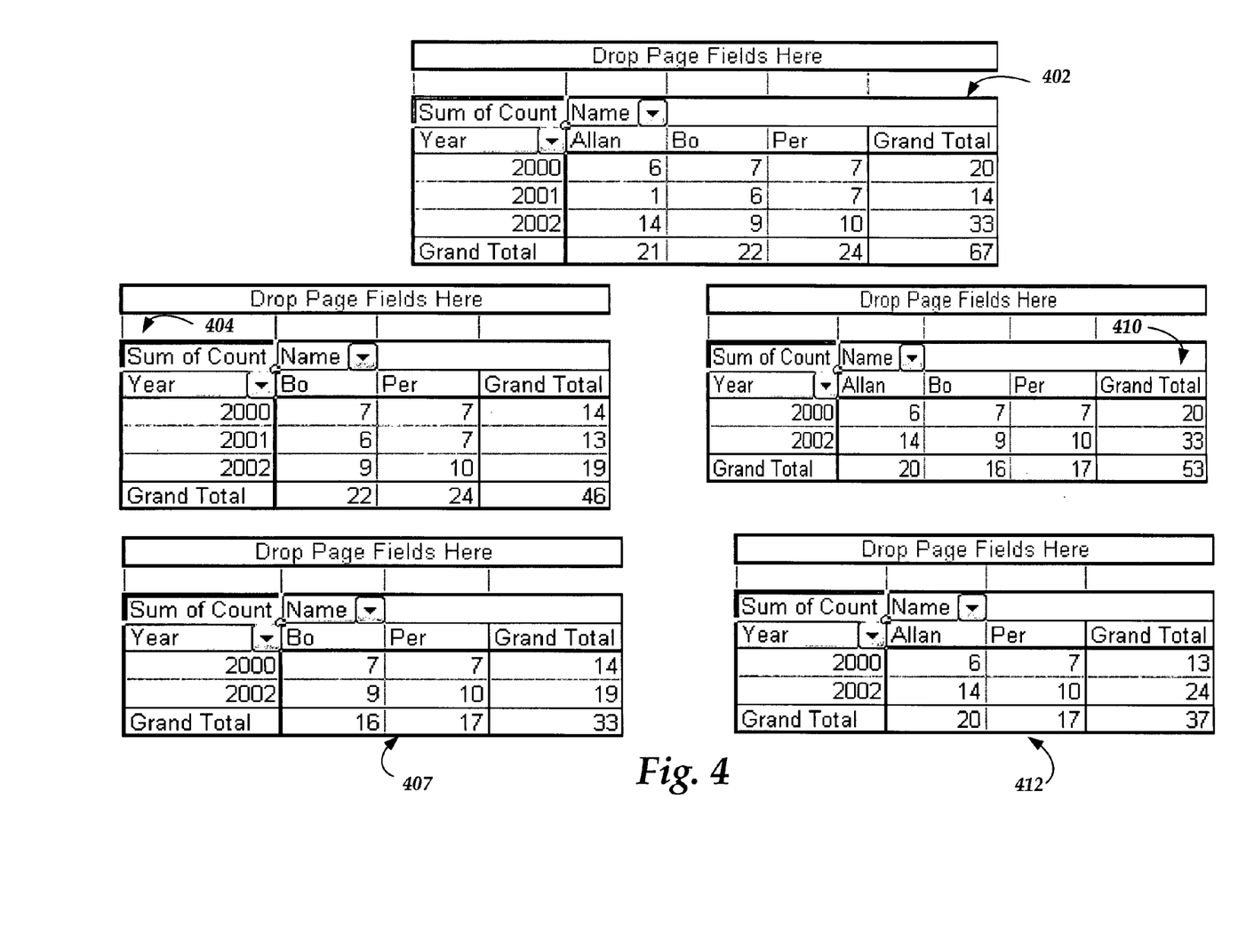
FIG. 4 shows computer screen displays of aggregated report stages illustrating the various stages of applying a collection of filters to a aggregated report in a designated order according to an illustrative embodiment of the present invention.

FIG. 4 shows computer screen displays of aggregate report stages 402, 404, 407, 410, and 412 illustrating the various stages of applying a collection of filters to an aggregate report in a designated order according to an illustrative embodiment of the present invention. These displays illustrate the importance of filter evaluation order when filtering based on aggregate or visual values in the aggregate report. For instance the aggregate report stage 402 illustrates an original aggregate report, for example an original PivotTable report, without any filter applied. When a top N value filter is applied on rows and a top N value filter is applied on columns based on visual or visible values in the aggregate report, the order of evaluation for these two filters determines what result is obtained.

For instance, applying a top 2 filter across the columns first yields the aggregate report stage 404 illustrating the top 2 columns having the largest total in a name column. In this case, Bo at 22 and Per at 24 have the top column values. Similarly, the aggregate report stage 407 illustrates a final result after applying the top 2 filter to the rows by year subsequent to the columns. In this case the years by row with the highest grand totals are the year 2000 with 14 and the year 2002 with 19.

In contrast, the aggregate report stage 410 illustrates applying the top 2 filter to the rows by year first. In this case, the years by row with highest grand totals are again the year 2000 this time with 20 and the year 2002 this time with 33. However, the aggregate report stage 412 yields a very different final result than the aggregate report stage 407. Applying the top 2 value filter to the columns last yields the names by column Allan with 20 and Per with 17. In this case Bo with 16 was filtered out because the year 2001 when Bo had 6 was filtered out during application of the top (2) value filter to the rows. It should also be appreciated that if non-visual global values were evaluated by the second filter, the aggregate report stage 412 would have yielded Bo with 22 and Per with 24. Additional details regarding filtering based on visual totals and the significance of filter evaluation order will be described below with respect to FIGS. 5 and 6.

Figure 5:
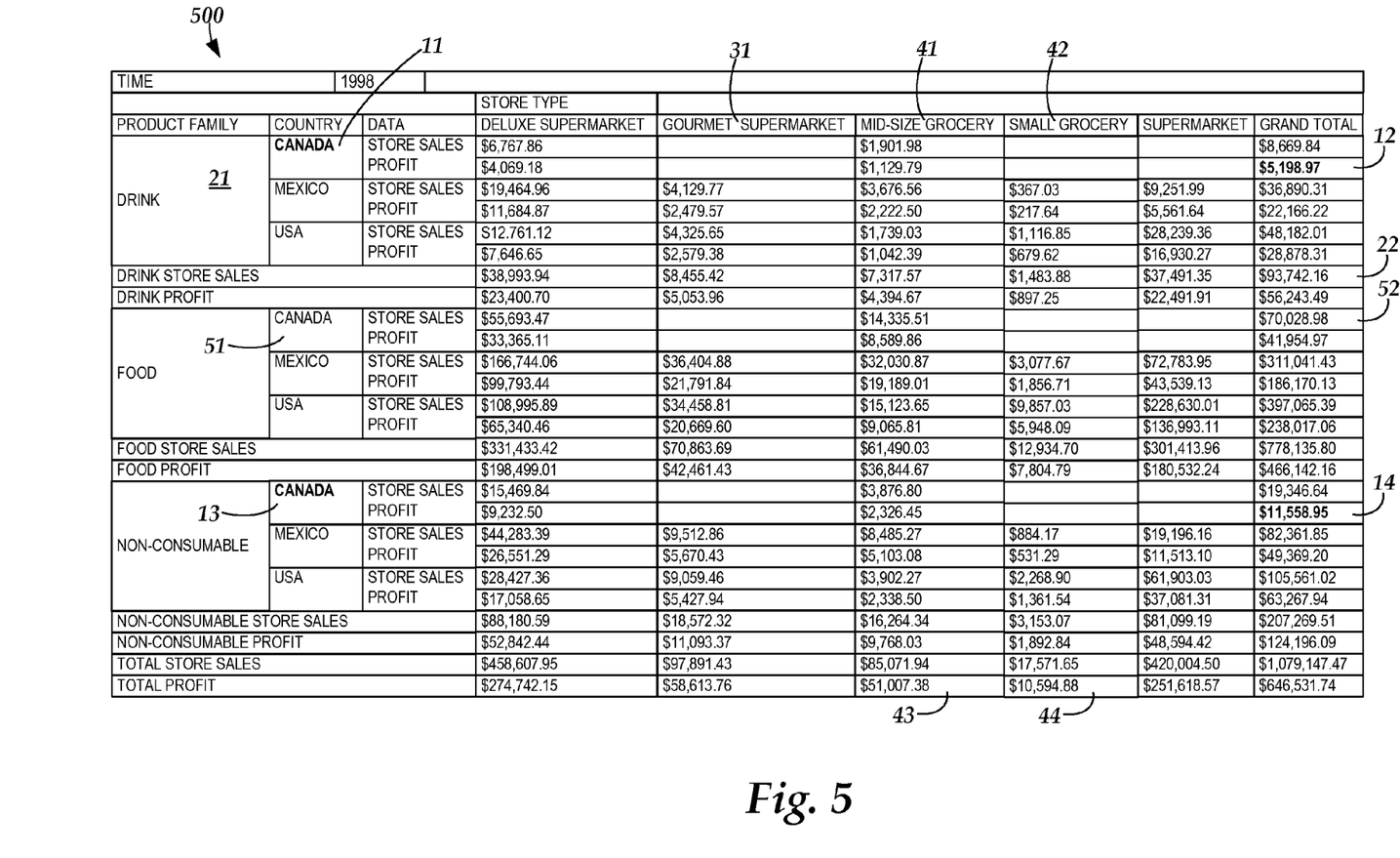
FIG. 5 is a aggregated report prior to having a collection of filters applied according to an illustrative embodiment of the present invention.

FIG. 5 is an aggregate report 500, a PivotTable report, prior to having a collection of filters applied according to an illustrative embodiment of the present invention. An example collection of filters having a designated evaluation order is listed in a table as follows:

TABLE 1

| Filter Collection | |
|---|---|
| 1. Country where Profit > $20,000 | Input: OriginalPivotTable |
|  | Output: FilteredPivotTable1 |
| THEN | |
| 2. TOP 2 Product Family by Store Sales | Input: FilteredPivotTable1 |
|  | Output: FilteredPivotTable2 |
| THEN | |
| 3. Store Type Does Not Equal "Gourmet Supermarket" | Input: FilteredPivotTable2 |
|  | Output: FilteredPivotTable3 |
| THEN | |
| 4. Store Type where Profit > $100,000 | Input: FilteredPivotTable3 |
|  | Output: FilteredPivotTable4 |
| THEN | |
| 5. TOP 2 Country by Sales | Input: FilteredPivotTable4 |
|  | Output: FinalFilteredPivotTable |

An example of aggregate and/or visual value based filtering, applying the filters listed in table 1, is illustrated with reference to FIGS. 5 and 6. The aggregate report 500 includes sales and profit results for 1998 delineated by product family, store type, and country. It should be appreciated that cross-tab components may be required to display a detailed layout of an aggregate report before any filters are applied. Referring to FIG. 5, the application program 107 is capable of performing operations where a person can go to a cell or field and collapse or hid the details, for example collapse all the countries within the drink field 21. Thus, a user would see the broad drink category but would not see Canada, Mexico and USA details any longer. In a state where the details have been hidden, an embodiment of the present invention is operative to not support applying filters to the aggregate report until the same level of detail is displayed for all fields. This feature facilitates the presentation of useful information to users.

It should also be appreciated that filtering on visual values or totals also makes filtering context sensitive to when multiple fields are nested on an axis (rows or columns). Filtering on inner nested fields will be based on the values for the outer nested context. For example, nesting products on the inside of years and applying a top 10 filter by sales to products will result in potentially different top 10 lists of products for each year when different products rank differently with regards to sales for different years.

The filter collection of Table 1 may be applied to visual values of the aggregate report 500 in one by one order. In the alternative, the filters may be combined in one sequence and applied to aggregate values of the aggregate report 500 in a single operation yielding a same result as the former. Additional details with regard to applying a filter collection in a single operation will be described below with respect to FIG. 9.

The first filter applied to the aggregated report 500 filters out countries where total profits are less than or equal to $20,000. Thus, Canada rows 11 for drink and 13 for non-consumable are filtered out due to the total profit fields 12 at $5,198.97 and 14 at $11,558.95 respectively. The cross-tab component receives the original aggregate report 500 as an input and evaluates the first filter against the original aggregate report view therein producing a first filtered intermediate aggregate report (not shown). Some grand totals change in response to the Canada rows being removed.

The next or second filter applied to the aggregate report 500 in a first filtered stage filters out product family members below the top two product families in store sales. Thus, an entire drink row 21 is filtered out due to the store sales 22 being below the top to product families. The global value for drink store sales is $93,742.16, however, the aggregate or visual value evaluated for drink store sales with the second filter after applying the first filter is $85,072.32 (not shown). The cross-tab component receives the first filtered intermediate aggregate report as an input and evaluates the second filter against the first filtered intermediate aggregate report view or aggregate values therein producing a second filtered intermediate aggregate report (not shown). Some grand totals change in response to the drink row being removed.

The next or third filter applied to the aggregate report 500 in a second filtered stage is a text filter that filters out store types equal to "Gourmet Supermarket". Thus, an entire column 31 is filtered out due to a text string equaling "Gourmet Supermarket". The cross-tab component receives the second filtered intermediate aggregate report as an input and evaluates the third filter against the second filtered intermediate aggregate report view or aggregate values therein producing a third filtered intermediate aggregate report (not shown). Some grand totals change in response to the "Gourmet Supermarket" column 31 being removed.

The next or fourth filter applied to the aggregate report 500 in a third filtered stage filters out store types where profit is below or equal to $100,000. Thus, entire store type columns 41 for "Mid-Size Grocery" and 42 for "Small Grocery" are filtered out due to the store profits 43 and 44 respectively being below or equal to $100,000. Although the global values for profit of store type columns 41 for "Mid-Size Grocery" and 42 for "Small Grocery" are $51,007.38 and $10,594.88 respectively, the aggregate or visual values evaluated for store type profits with the fourth filter after applying the third filter is $44,286.25 and $9,697.63 (not shown). The cross-tab component receives the third filtered intermediate aggregate report as an input and evaluates the fourth filter against the third filtered intermediate aggregate report view or aggregate values therein producing a fourth filtered intermediate aggregate report (not shown). Some grand totals change in response to the store type rows being removed.

The next or fifth filter applied to the aggregate report 500 in a fourth filtered stage filters out country rows where sales are below the top 2 countries for sales. Thus, a Canada row 51 for food is filtered out due to the store sales 52 being below the top 2 countries for sales. Although the global value for store sales is $70,028.98, the aggregate or visual value evaluated for store sales with the fifth filter after applying the fourth filter is $55,693.47 (not shown). The cross-tab component receives the fourth filtered intermediate aggregate report as an input and evaluates the fifth filter against the fourth filtered intermediate aggregate report view or aggregate values therein producing a fifth and final filtered intermediate aggregate report 500' (FIG. 6). Some grand totals change in response to the Canada row for food 51 being removed.

Figure 6:
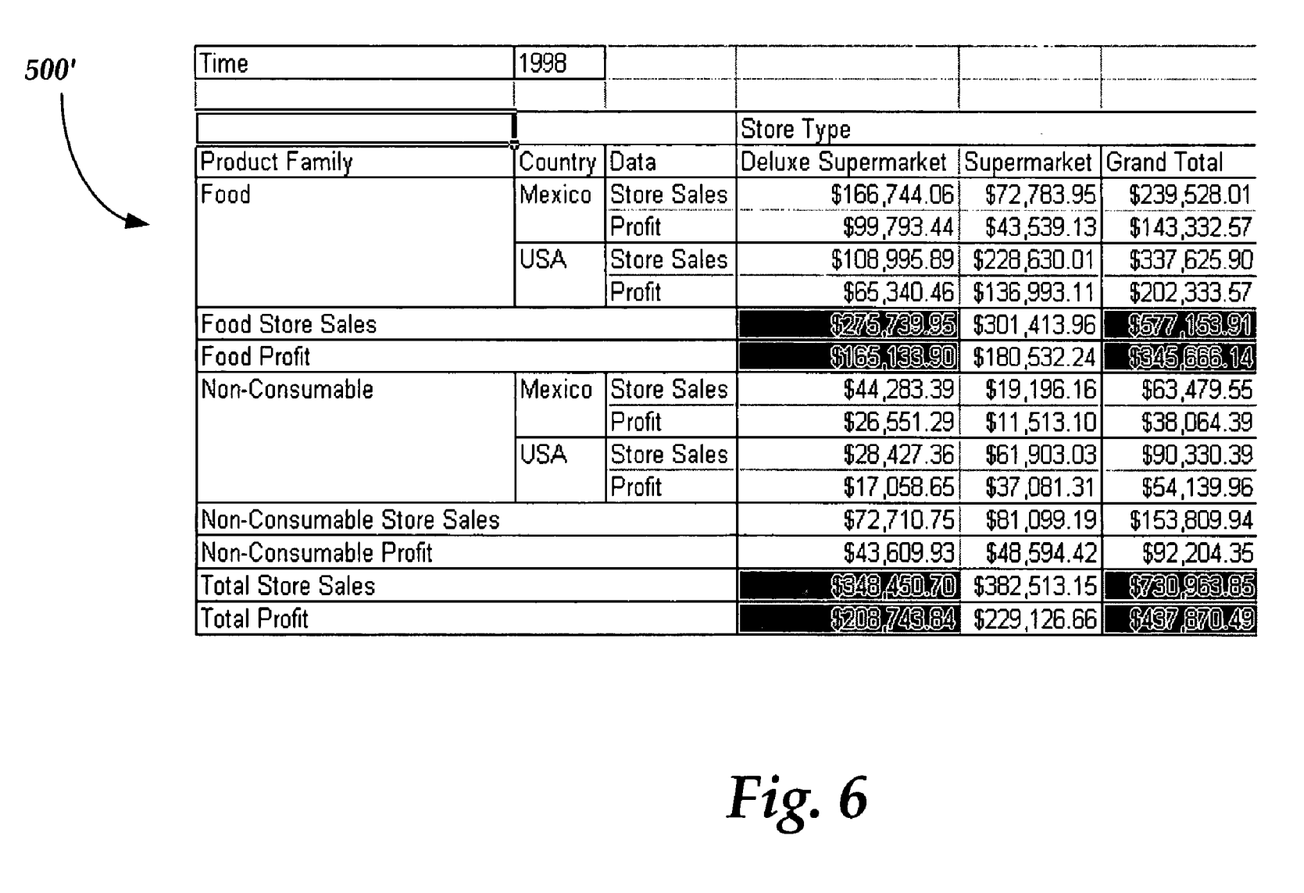
FIG. 6 is a filtered version of the aggregated report of FIG. 5 after having the collection of filters applied according to an illustrative embodiment of the present invention.

FIG. 6 is a filtered version 500' of the aggregate report 500 of FIG. 5 after having the collection of filters in table 1 applied according to an illustrative embodiment of the present invention.

FIGS. 7a-10 are illustrative routines or operational flows performed in dynamically filtering aggregate reports based on aggregate values according to illustrative embodiments of the invention. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 7a-10, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Figure 7A:
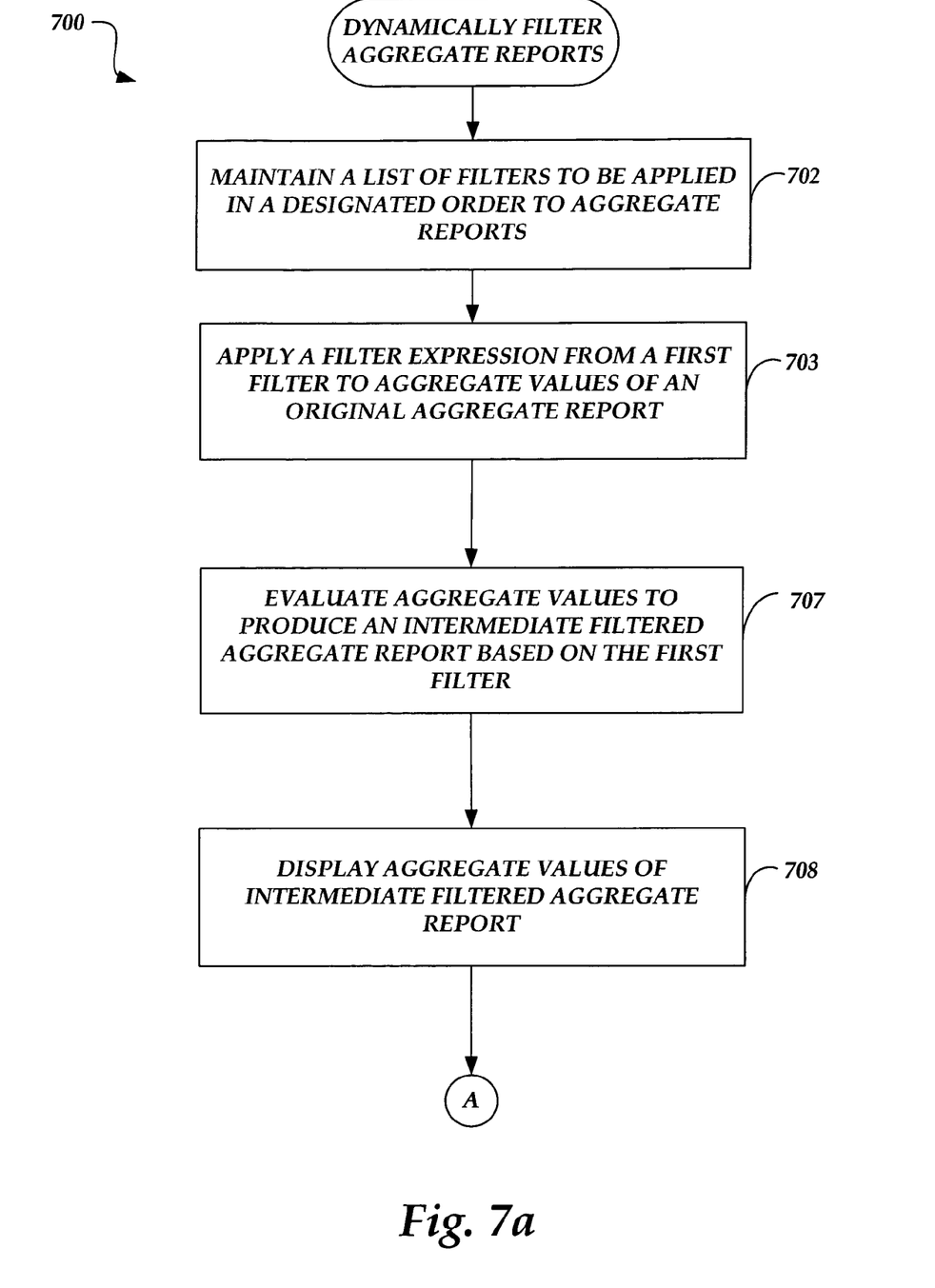
FIGS. 7a-7b are an illustrative operational flow performed in dynamically filtering aggregated reports based on aggregate values according to an illustrative embodiment of the present invention.
Figure 7B:
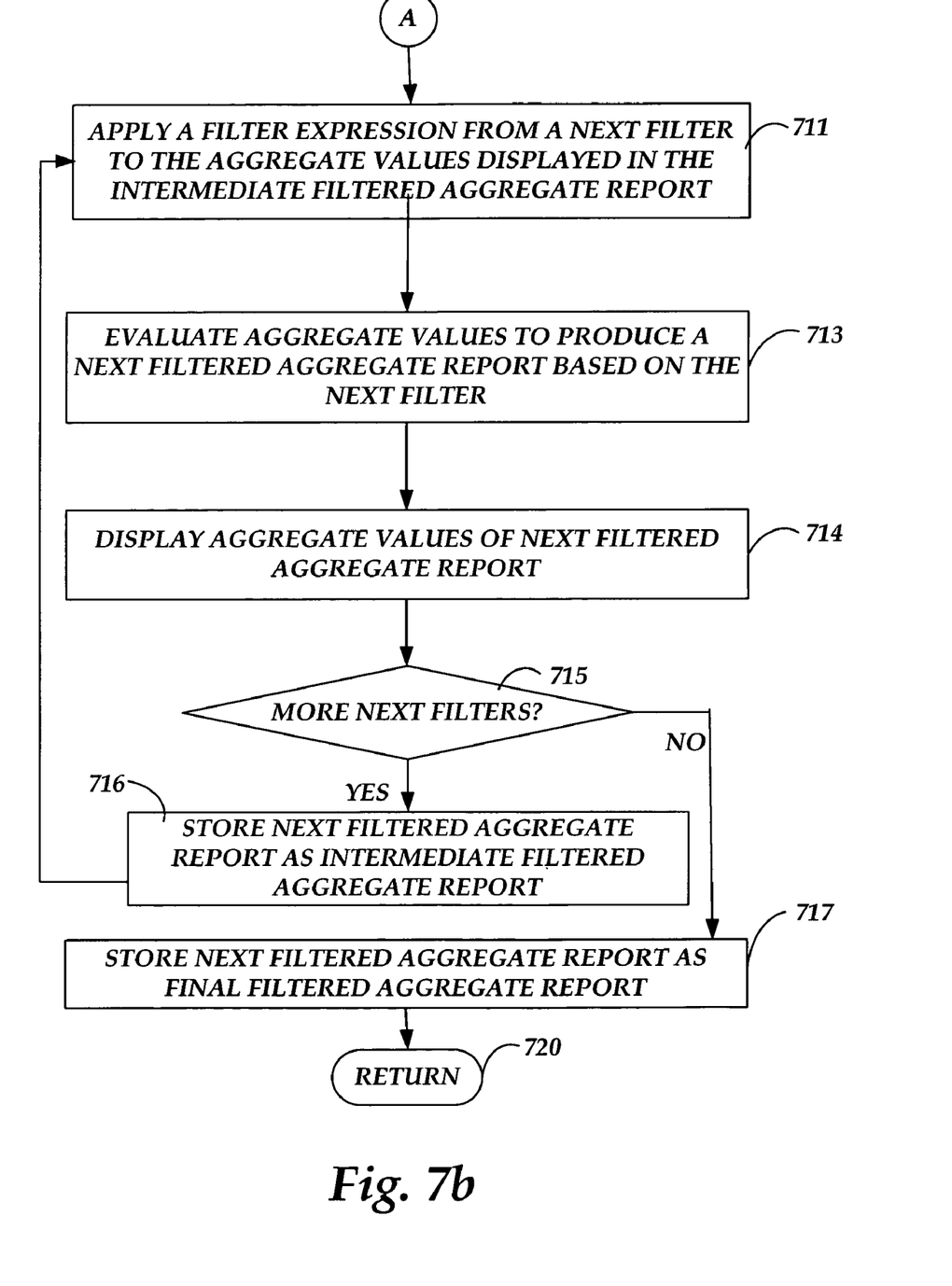

FIGS. 7a-7b are an illustrative operational flow performed in dynamically filtering aggregate reports, for instance PivotTable reports, based on aggregate values resulting from one or more previously applied filters according to an illustrative embodiment of the present invention. The routine 700 begins at operation 702 where ARC 108 maintains a list of filters to be applied in a designated order to one or more aggregate reports. The routine 700 continues at operation 703.

At operation 703, the ARC 108 applies a filter expression from a first filter to aggregate or visual values of an original aggregate report. Next, at operation 707, the ARC 108 evaluates the aggregate values to produce an intermediate filtered aggregate report based on the first filter. The routine 700 then continues at operation 708.

At operation 708 the ARC 108 displays the aggregate values in the intermediate filtered aggregate report. The routine 700 then continues to operation 711 where the ARC 108 applies a filter expression from a next filter to the aggregate values displayed in the aggregate report. It should be appreciated that when the aggregate values are not displayed in an aggregate report, the ARC 108 still evaluates the aggregate values instead of global values.

Next, at operation 713, the ARC 108 evaluates the aggregate values to produce a next filtered aggregate report based on the next filter. The routine 700 then continues at operation 714.

At operation 714, the ARC 108 displays the aggregate values of the next filtered aggregate report. Next at operation 715, the ARC 108 determines whether more next filters yet to be applied remain in a filter collection. In response to determining that no more filters yet to be applied remain, the routine 700 continues from operation 715 to operation 717 where the ARC 108 stores the next filtered aggregate report as a final filtered aggregate report. The routine 700 then returns control to other routines at return operation 720.

When at operation 715, the ARC 108 determines that more next filters yet to be applied remain in the collection, the routine 700 continues from operation 715 to operation 716. At operation 716, the ARC 108 stores the next filtered aggregate report as the intermediate filtered aggregate report. The routine 700 then returns to operation 711 described above.

Figure 8:
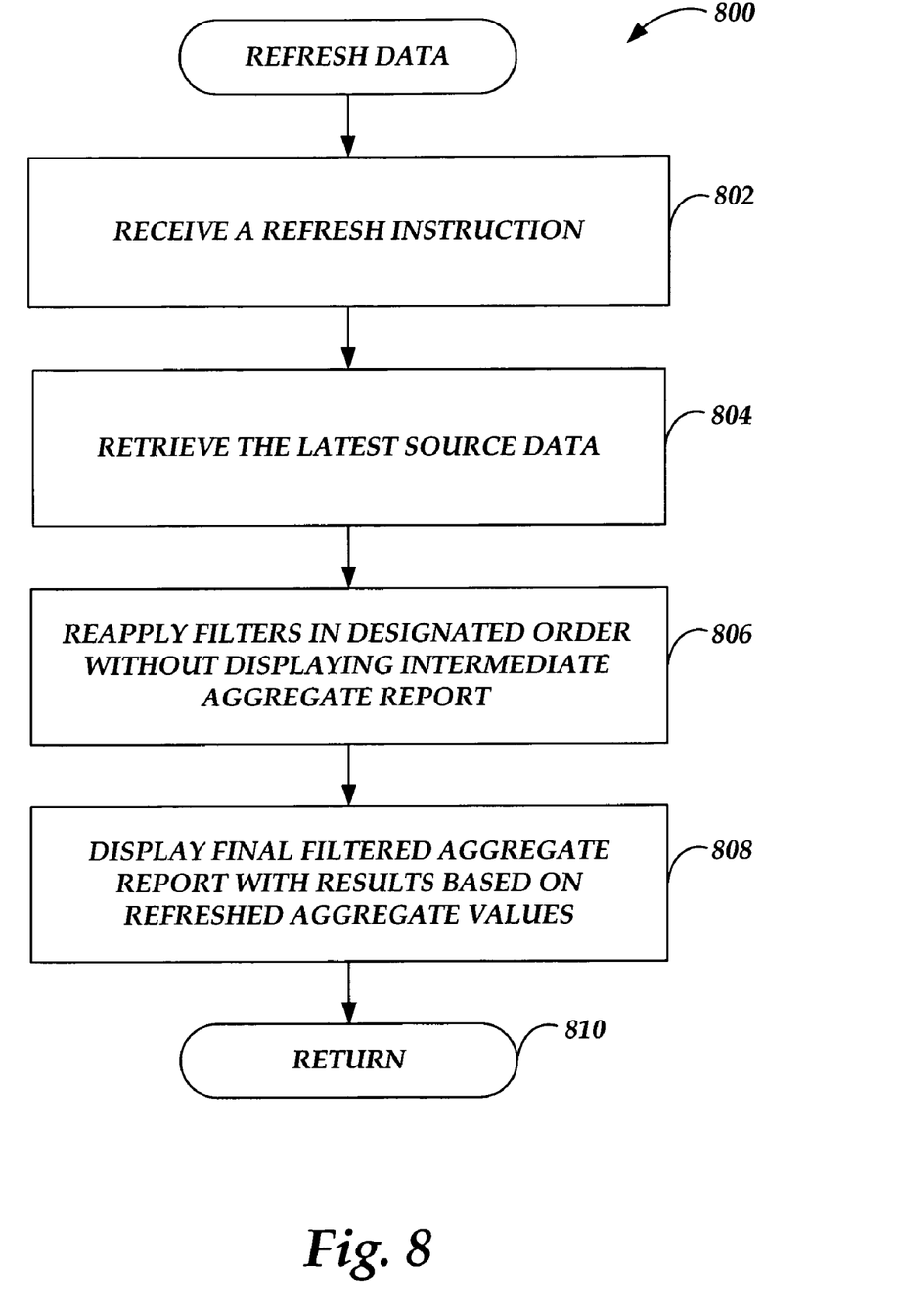
FIG. 8 is an illustrative operational flow performed in refreshing data according to an illustrative embodiment of the present invention.

FIG. 8 is an illustrative operational flow performed in refreshing data according to an illustrative embodiment of the present invention. Filtering in aggregate reports is dynamic. Thus, moving fields around in the aggregate report, or performing other operations that cause the aggregate report to refresh the data, will cause the ARC 108 to dynamically reapply all the filters. The filters are reapplied based on the same rules and in the same order as they were originally applied. This ensures that new data is evaluated and potentially included in dynamic filters.

The routine 800 begins at operation 802 where the ARC 108 receives a refresh instruction. The refresh instruction may be received in response to an update to a database, a change in the filter collection, and/or a change in a field of an aggregate report. The routine 800 then continues to operation 804.

At operation 804, the ARC 108 retrieves the latest source data supplying aggregate reports. Then at operation 806, the ARC reapplies the filter collection in the designated order. It should be appreciated that reapplying of the filters may take place without displaying one or more intermediate aggregate reports, yet the filters are still applied to aggregate values in the same manner.

The routine 800 then continues to operation 808 where the ARC 108 displays a final filtered aggregate report with results based on refreshed aggregate values. The routine 800 then returns control to other routines at return operation 810.

Figure 9:
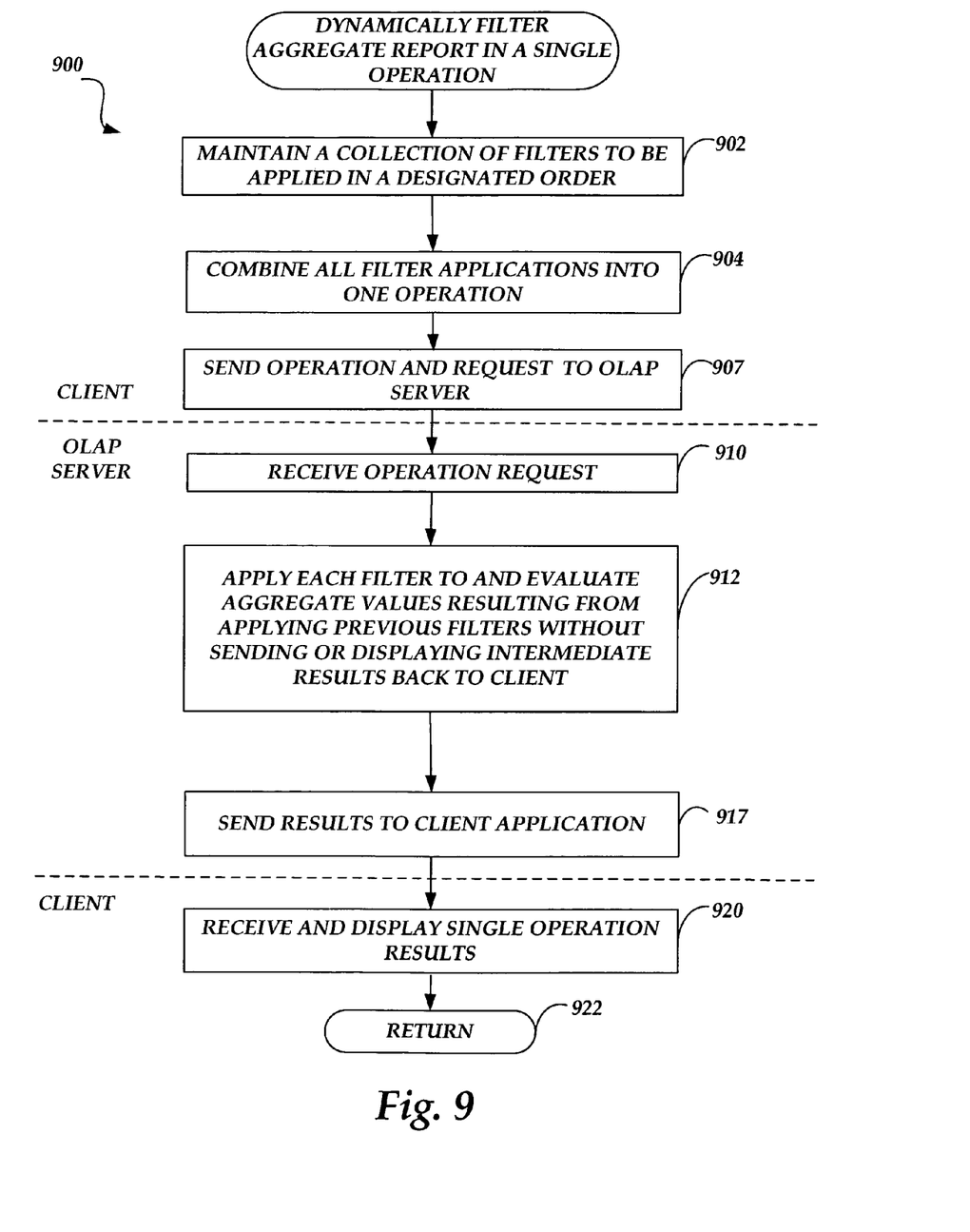
FIG. 9 is an illustrative operational flow performed in dynamically filtering a aggregated report in a single operation according to an illustrative embodiment of the present invention.

FIG. 9 is an illustrative operational flow 900 performed in dynamically filtering an aggregated report in a single operation according to an illustrative embodiment of the present invention. The operational flow 900 begins at operation 902 where the ARC 108 maintains a collection of filters to be applied in a designated order. The operational flow 900 continues to operation 904.

At operation 904, the client OLAP application 104 combines all filter applications into one operation. Next at operation 907, the client OLAP application 104 sends a request to apply filters and the single operation to the server 112. The operational flow 900 then continues at operation 910.

At operation 910, the OLAP server application 117 receives the single operation request. Next, at operation 912, the OLAP server application 117 applies each filter to and evaluates aggregate values that result from applying any previous filters in the collection. This single operation is executed without sending or displaying intermediate results back to the client OLAP application 104.

Next at operation 912, the OLAP server application 117 evaluates aggregate values of the aggregate report. It should be appreciated that multiple filters can be applied to different fields in an aggregated report at the same time. Some of these filtered fields may reside in a row area, a column area, a hidden area (not visible in the aggregate report), or in the page filter area of an aggregate report. In the alternative, the page filter area may be evaluated before all other filters. Next, at operation 917, the OLAP server 117 sends results of the single operation back to the OLAP client application 104. The operation flow 900 then continues to operation 920 where the OLAP client application receives the results and the ARC 108 displays the results in an aggregate report. The operation flow 900 returns control to other routines at return operation 922.

Figure 10:
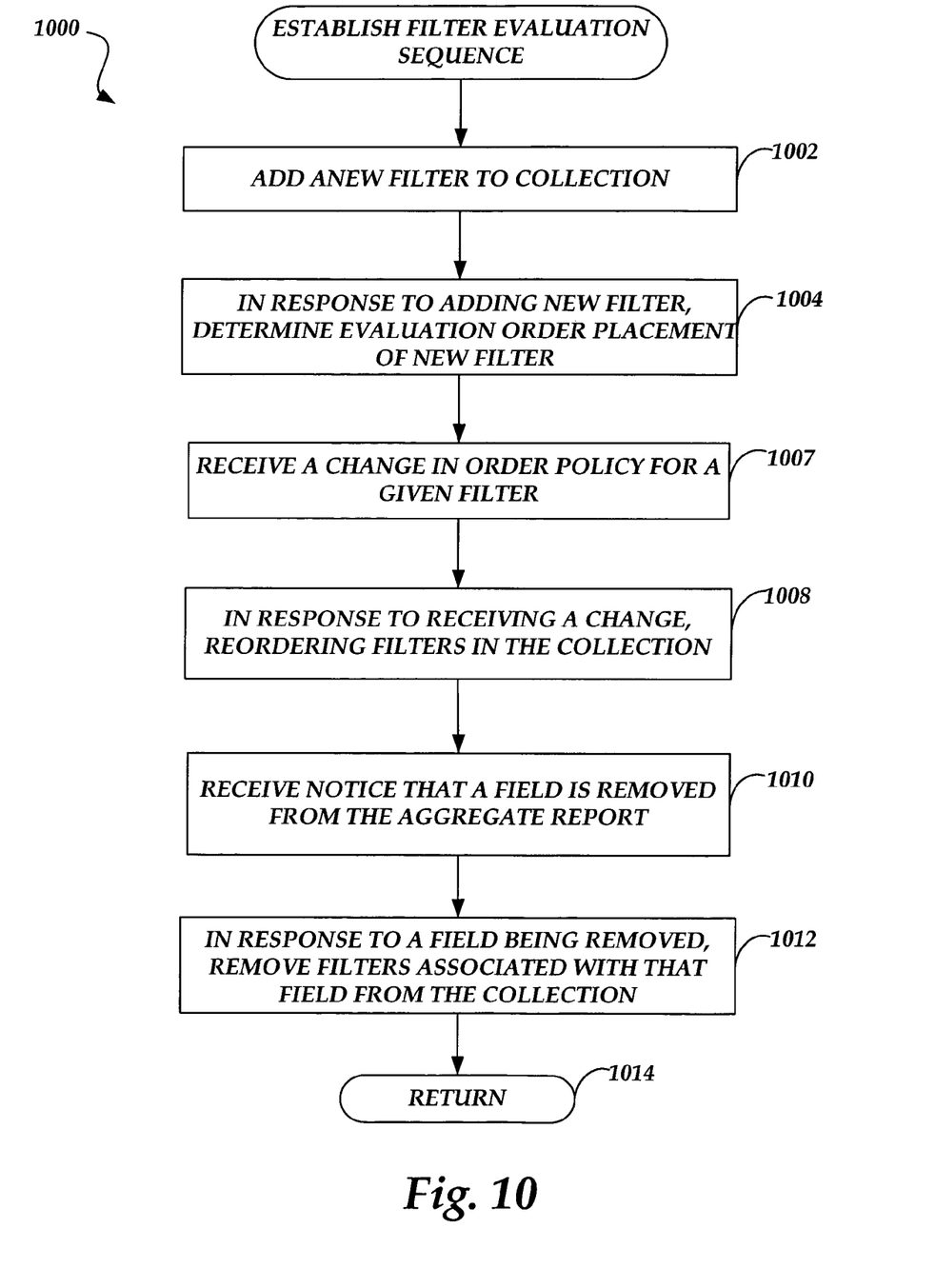
FIG. 10 is an illustrative operational flow performed in establishing a filter evaluation sequence according to an illustrative embodiment of the present invention.

FIG. 10 is an illustrative operational flow performed in establishing a filter evaluation sequence according to an illustrative embodiment of the present invention. The routine 1000 begins at operation 1002 where the ARC 108 adds a new filter to the collection. Next, at operation 1004, in response to adding the new filter, the ARC 108 determines an evaluation order placement for the new filter. The routine 1000 then continues to operation 1007.

At operation 1007, the ARC 108 receives a change in order policy for a given filter. Next at operation 1008 in response to receiving the change in order policy, the ARC 108 reorders the filters in the collection. The routine 1000 then continues to operation 1010.

At operation 1010, the ARC 108 receives notice that a field has been removed from an aggregated report. Then at operation 1012 in response to the field being removed, the ARC 108 removes filters from the collection that are solely associated with the removed field. The routine 1000 then returns control to other routines at return operation 1014.

The filter types included in the aggregate and/or visual values evaluation order are as follows:

TABLE 2

Filter Types

Text filters (dynamically filtering by item captions, e.g. filter by product names which contain "Ab")
Value filters (dynamically filtering items by the value of a data field, e.g. filter by products which sold more then $1,000,000)
Date filters (dynamically filter by value of date items, e.g. for a date type field, filter by dates newer than 2000)
Top/Bottom filters (dynamically filter items by the value of a data field, e.g. filter by top 10 products by sales)

An order of applying filters may be the order by which the filters were originally created. This is also true when reapplying filters on refresh. Editing an existing filter will not change the filter's position in the evaluation order. Editing a filter is defined as changing the type of name for a filter, such as from 'contains' to 'greater than', changing the type of value filter, such as from greater than to less than, and changing the type of date filter, such as from last week to last month. However, once a filter on a field is deleted, either explicitly or manually, the filter is out of the evaluation order list so applying a filter of the same type to the same field again later will add it to the end of the evaluation order list.

Based on the foregoing, it should be appreciated that the various embodiments of the invention include methods, systems, and computer-readable mediums for dynamically filtering a aggregate report based on values resulting from one or more filters previously applied to the aggregate report. The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for dynamically filtering aggregate reports based on visible values in the aggregated reports, the method comprising:

a) maintaining a plurality of filters to be applied in a designated order to the aggregated reports, wherein the each of the aggregated reports comprises a plurality of fields for displaying report details, wherein the report details are collapsible within each of the plurality of fields causing the report details to be hidden;

b) applying, by the computer, a first filter to an original aggregate report, wherein the first filter is applied to the original aggregate report only when the report details for at least one of the plurality of fields are hidden with respect to other report details which are displayed within at least one other field within the plurality of fields;

c) evaluating values of the original aggregated report based on the first filter therein producing an intermediate filtered aggregate report, wherein evaluating values of the original aggregated report comprises filtering inner nested fields based on visible values for a corresponding outer nested field;

d) applying a next filter to the intermediate filtered aggregate report; and e) evaluating visible values of the intermediate filtered aggregate report based on the next filter therein producing a next filtered aggregate report, wherein evaluating visible values comprises aggregating totals from applying the first filter and using the totals aggregated as inputs for aggregating totals from applying the next filter and wherein evaluating visible values of the intermediate aggregated report also comprises filtering inner nested fields based on visible values for a corresponding outer nested field.

2. The method of claim 1, further comprising:

f) determining whether there is another next filter from the plurality of filters yet to be applied;

g) in response to determining that there is another next filter yet to be applied:
   storing the next filtered aggregate report as the intermediate filtered aggregate report; and
   repeating d)-g); and h) in response to determining that there is not another next filter yet to be applied, storing the next filtered aggregate report as a final filtered aggregate report.

3. The method of claim 1, further comprising displaying the visible values of the intermediate filtered aggregate report.

4. The method of claim 2, further comprising:
receiving a refresh instruction; and
in response to receiving the refresh instruction:
   retrieving updated source data; and
   reapplying the plurality of filters in the designated order based on the updated source data therein producing an updated final filtered aggregate report.

5. The method of claim 4, wherein reapplying the plurality of filters comprises reapplying the plurality of filters in a single operation without displaying the intermediate filtered aggregate report.

6. The method of claim 4, wherein receiving the refresh instruction comprises receiving a refresh instruction in response to at least one of adding a field to an aggregated report or removing a field from a aggregate report, further comprising:
   receiving notice that a field has been removed from a aggregate report;
   in response to the field being removed, removing any filters only associated with the field from the plurality of filters.

7. The method of claim 1, wherein the designated order is based on an order in which each filter is added to the plurality of filters, further comprising:
   adding a new filter to the plurality of filters; and
   determining an evaluation order placement for the new filter.

8. The method of claim 7, further comprising:
receiving a change in order policy for the plurality of filters; and
in response to receiving the change in order policy, reordering the evaluation order placement for the plurality of filters wherein the plurality of filters having a designated order of evaluation is exposed by an application program interface.

9. The method of claim 1, further comprising applying multiple filters of the plurality of filters at the same time to different fields of an aggregate report wherein the different fields reside in at least one of a row area of the aggregated report, a column area of the aggregate report, a hidden area of the aggregate report, or a page filter area of the aggregate report.

10. The method of claim 1, wherein applying the first filter to the original aggregate report and applying a next filter to the intermediate filtered aggregate report comprises applying filters to a relational aggregate report or to an online analytical processing (OLAP) aggregate report and wherein maintaining a plurality of filters comprises maintaining at least one of the following filter types:
   a text filter operative to dynamically filter by captions;
   a value filter operative to dynamically filter by a value of a data field;
   a date filter operative to dynamically filter by a value of a date item; and
   a top/bottom filter operative to dynamically filter by values of data fields.

11. A computer program product comprising a computer-storage medium having control logic stored therein for causing a computer to dynamically filter an aggregate report based on values resulting from one or more filters previously applied to the aggregate report, the control logic comprising computer-readable program code for causing the computer to:

a) maintain a collection of filters to be applied in a designated evaluation order to the aggregate report, wherein the aggregate report comprises a plurality of fields for displaying report details, wherein the report details are collapsible within each of the plurality of fields causing the report details to be hidden;

b) apply a first filter to the aggregate report, wherein the first filter is applied to the aggregate report only when the report details for at least one of the plurality of fields are hidden with respect to other report details which are displayed within at least one other field within the plurality of fields;

c) evaluate aggregate values in the aggregate report based on the first filter therein producing aggregate values in the aggregate report resulting from applying the first filter, wherein evaluate aggregate values of the aggregate report comprises filtering inner nested fields based on visible values for a corresponding outer nested field;

d) apply a next filter to the aggregate report; and e) based on the next filter, evaluate the aggregate values in the aggregate report resulting from any filters previously applied therein producing aggregate values in the aggregate report resulting from applying the next filter, wherein the evaluation based on the next filter comprises aggregating totals from applying the first filter and using the totals aggregated as inputs for aggregating totals from applying the next filter and wherein evaluate the aggregate values of the aggregate report comprises filtering inner nested fields based on visible values for a corresponding outer nested field.

12. The computer program product of claim 11, further comprising computer-readable program code for causing the computer to:
- f) determine whether there is another next filter yet to be applied from the collection of filters;
- g) apply the another next filter to the aggregate report in response to determining that there is another next filter yet to be applied;
- h) based on the another next filter, evaluate the aggregate values in the aggregate report resulting from any filters previously applied therein producing aggregate values in the aggregate report resulting from applying the another next filter; and
- i) repeat f)-h).

13. The computer program product of claim 11, further comprising computer-readable program code for causing the computer to:
- display the aggregate report wherein the computer-readable program code for causing the computer to evaluate values resulting from any filters previously applied comprises computer-readable program code for causing the computer to evaluate visual values displayed in the aggregate report.

14. The computer program product of claim 11, further comprising computer-readable program code for causing the computer to:
- receive a refresh instruction; and
- in response to receiving the refresh instruction:
  - retrieve updated source data; and
  - reapply the collection of filters in the designated evaluation order based on the updated source data therein producing an updated final filtered aggregate report.

15. A computer-implemented method for dynamically filtering an aggregate report based on values resulting from one or more filters previously applied to the aggregate report, the method comprising:
- a) maintaining a collection of filters to be applied in a designated evaluation order to the aggregate report, wherein the aggregate report comprises a plurality of fields for displaying report details, wherein the report details are collapsible within each of the plurality of fields causing the report details to be hidden;
- b) applying, by the computer, a filter to the aggregate report, wherein the filter is applied to the aggregate report in response to hiding the report details displayed within at least one of the plurality of fields;
- c) based on the filter, evaluating aggregate values in the aggregate report to produce aggregate values resulting from applying the filter, wherein evaluating aggregate values of the aggregate report comprises filtering inner nested fields based on visible values for a corresponding outer nested field;
- d) applying another filter to the aggregate report; and
- e) based on the another filter, evaluating the values in the aggregate report resulting from applying the filter therein aggregating the aggregate values resulting from applying the another filter, wherein evaluating the values based on the another filter comprises aggregating totals from applying the filter and wherein evaluating the values in the aggregate report based on the another filter also comprises filtering inner nested fields based on visible values for a corresponding outer nested field.

16. The method of claim 15, further comprising:
- f) determining whether there is a next filter yet to be applied from the collection of filters;
- g) applying the next filter to the aggregate report in response to determining that there is a next filter yet to be applied;
- h) based on the next filter, evaluating values in the aggregate report resulting from previously applying any filters therein aggregating aggregate values in the aggregate report resulting from applying the next filter; and
- i) repeating f)-h).

17. The method of claim 16, further comprising:
- displaying the aggregate report wherein evaluating the aggregate values resulting from previously applying any filter comprises evaluating visual values displayed in the aggregate report after the any filters have been applied.

* * * * *